United States Patent [19]

Löfgren et al.

[11] Patent Number: 4,643,564
[45] Date of Patent: Feb. 17, 1987

[54] CLOUD HEIGHT MEASURING MEANS

[75] Inventors: Folke Löfgren; Sven E. Söderström, both of Västerås, Sweden

[73] Assignee: ASEA Aktiebolag, Västerås, Sweden

[21] Appl. No.: 541,424

[22] Filed: Oct. 13, 1983

[30] Foreign Application Priority Data

Oct. 15, 1982 [SE] Sweden ................. 8205864

[51] Int. Cl.⁴ .......... G01C 3/00; G01C 5/00; G01C 3/08
[52] U.S. Cl. .......................... 356/5; 356/1; 356/4
[58] Field of Search ............... 356/1, 4, 5; 343/5 SM

[56] References Cited

U.S. PATENT DOCUMENTS

| | | |
|---|---|---|
| 3,741,655 | 6/1973 | Ling et al. .................. 356/5 |
| 3,947,119 | 3/1976 | Bamberg et al. ............. 356/4 |
| 4,106,872 | 8/1978 | Söderström .................. 356/5 |
| 4,208,125 | 6/1980 | Ling ........................... 356/5 |
| 4,259,592 | 3/1981 | Früngel et al. ............... 356/5 |
| 4,289,397 | 9/1981 | Stzkan et al. ................ 356/5 |

Primary Examiner—Stephen C. Buczinski
Attorney, Agent, or Firm—Watson Cole Grindle & Watson

[57] ABSTRACT

A method for measuring cloud height, in which a train of light pulses is sent from a transmitter into the investigated air space. From each of a number of different height intervals, signals reflected towards a receiver are integrated and measured. The time, the pulse number, the pulse frequency and/or the pulse energy for each height interval are controlled with respect to the energy reflected and received in the receiver from underlying measuring intervals, thus obtaining compensation for losses in the energy of the light pulses in reaching the respective level.

12 Claims, 4 Drawing Figures

CLOUD HEIGHT MEASURING MEANS

BACKGROUND OF THE INVENTION

1. Field of the Invention

The present invention relates to a method for measuring cloud height by measuring the transit time of a light pulse emitted from the ground upwardly into an air space to be investigated and reflected back to the ground by a cloud. The measuring range is divided into a plurality of different height bands which are scanned sequentially starting from the lowest height band and extending up to the highest height band at the top end of the measuring range. A train of incident light pulses is emitted from a ground-based transmitter up into the investigated air space and signals from each one of these height bands, reflected towards a ground-based receiver, are integrated and measured.

In this specification the reference to "light" should be taken to include electromagnetic radiation at suitable frequencies in the infra red and ultraviolet regions of the spectrum and not just visible light.

The determination of cloud height by transit time measurement requires a measuring of the time which elapses from the emission of a light pulse from the transmitter until reflections of an at least pre-defined strength are received by the receiver.

2. Description of Prior Art

One method of cloud height measurement generally similar to that to which this invention relates is described in U.S. Pat. No. 3,741,655. The method described in U.S. Pat. No. 3,741,655 consists of dividing up the measuring range—by means of gate pulses which are time-delayed step-by-step and which control the signal detector in the receiver—into height bands or intervals and filtering a number of echo signals from the respective height interval, whereby the signal-to-noise ratio increases with the root of the number of filtered echo pulses (the number of "samples"). Since the aim is to detect echo signals from a cloud, echo signals from water droplets and other particles in the air space below the cloud, as well as the attentuation caused by these, can be regarded as a disturbance which, for a measuring sequence with a fixed time-controlled sensitivity control and/or a fixed energy input of the measuring pulses, may result in incorrectly measured values of cloud height or even make it impossible to detect clouds which do exist. Operating with a fixed energy input of the measuring pulses, it is necessary to use a receiver and signal detector having a very large dynamic range. The method of cloud height detection previously used employed an emitted light energy which was constant and was thus not related to the level of atmospheric attentuation currently occurring in the atmosphere below the respective measuring band. This known method gives, under many weather situations, an incorrect balancing between the level of incident energy supplied and the demand for measuring energy at different height levels in order to obtain a satisfactory measuring signal. In addition, the previous method makes use of a relative measurement between two relatively adjacently positioned height intervals, which does not provide any possibilities of compensating for a varying light signal attenuation in the atmosphere.

OBJECTS OF THE INVENTION

One object of the present invention is to provide a measuring method which adapts the supply of measuring energy and the sensitivity of the equipment to the weather conditions and to the altitude at which measurements are being made. A further object is to provide a measuring method in which an indication is given of the maximum height at which the measuring device is capable of making an acceptably accurate measurement under the prevailing weather conditions.

SUMMARY OF THE INVENTION

The cloud-height measuring method according to the invention is characterized in that the measured values of reflected light, which are integrated over all altitude bands below the altitude band in which a measurement is currently being made are used to control the energy input of the light pulses emitted for the current altitude band measurement by changing the measuring time and thereby the pulse number of the light pulses and/or the pulse frequency and/or the pulse energy for each altitude band in such a way that the signal energy, received in the signal detector for each altitude band, is maintained substantially constant and compensates for variations in the atmospheric attenuation up to the altitude at which it is practically possible to make a measurement.

Thus, the method of the invention involves determining the light attenuation in the atmosphere for each measuring height by an integration of the reflected energy from all the altitude bands below the band in question, and on the basis of the value of the atmospheric attenuation of the measuring signal thus obtained, compensating for the atmospheric attenuation by increasing the time and/or pulse number, pulse power and/or pulse frequency of the emitted light pulses with a view to maintaining, at all times, a constant detected signal level in the signal detector for a cloud after such compensation. The attenuation-dependent compensation discussed above is preferably additional to a quadratic height compensation (i.e. a compensation proportional to $h^2$, h=cloud height; see FIG. 3, curve 10), obtained in a similar manner by changing the time of measurement, the pulse frequency or the energy, and any necessary compensation required having regard to the geometrical relation between the transmitter beam and the receiver field of view (see FIG. 2).

BRIEF DESCRIPTION OF THE DRAWINGS

The invention will be exemplified in greater detail, by way of example, with reference to the accompanying drawing, in which.

DESCRIPTION OF THE PREFERRED EMBODIMENT

Figure 4:
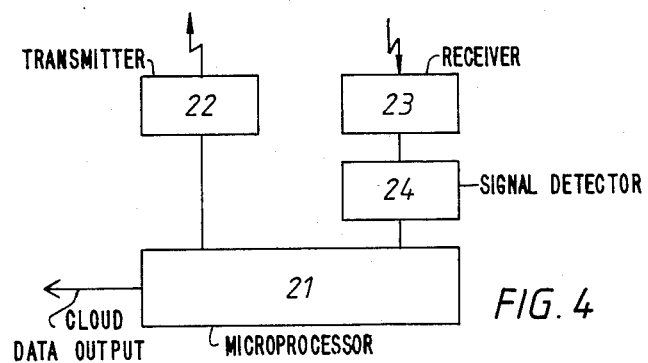
FIG. 4 shows the principle components of a measuring system operating according to the method of the invention.

The principle components of a measuring system operating in accordance with the method of this invention are shown in FIG. 4. The system consists of a microprocessor 21 connected to a transmitter 22 for incident light pulses, a receiver 23 for reflected light pulses and a signal detector 24 for filtering out light signals reflected back from a given altitude band. During a cloud height measurement, the entire measuring range, for example 30 to 3000 m, is scanned by varying the opening time for the detector 24 in intervals to specified delays after the emission of a light pulse from the transmitter 22. This delay is constant for all pulses reflected from the same height level or altitude band, starting for example at a measuring height of 30 m. The delay between the moment a pulse of light is emitted from the transmitter 22 and the moment the detector is opened to sense the reflected pulse is suitably increased in intervals until the entire measuring range, or at least a selected part thereof, has been scanned.

Figure 1:
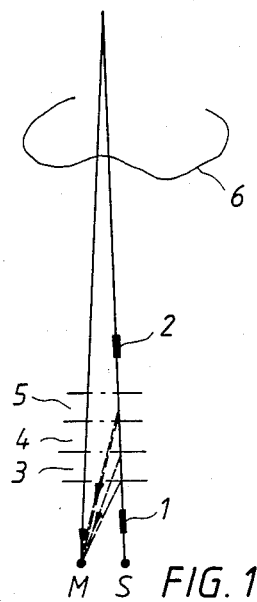
FIG. 1 shows reflection at different measuring heights.

FIG. 1 shows how a number of measuring pulses 1, 2 are sent out, towards a cloud 6 in a given air space, from a light transmitter S. Within each measuring range, for example the indicated height bands 3, 4 and 5, signals are reflected back towards a receiver M. The light attenuation in the atmosphere at these levels 3 to 5 can be determined for each height band by integrating the reflected energy received in M up to the measuring height which is of immediate interest (here the altitude of the cloud 6). In accordance with the method of this invention the current value of the attenuation, integrated in M, is compensated for by increasing the measuring time allocated for each of the different altitude bands, for example bands 3 to 5, increasing the pulse number (which is the same as increasing the measuring time), the pulse energy or the pulse frequency (from S) with a view to maintaining, at all times, a certain, for example a constant, measuring energy for the respective measuring level in order to obtain a substantially constant signal level in the signal detector (the receiver M) for light reflected from the cloud 6 after the compensation, irrespective of the altitude of the cloud.

It is, for example, possible to increase the time at which measurements are made at each altitude level, whereby receipt of a larger number of reflected light pulses gives a larger integrated signal, that is, compensation for the attenuation at this lower level is obtained.

Figure 2:
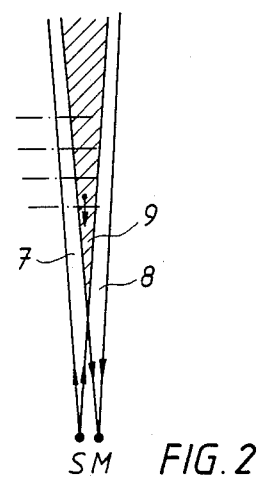
FIG. 2 shows the transmitting and receiving ranges of a transmitter (S) and a receiver (M), respectively.

FIG. 2 shows the transmission cone 7 emanating from the transmitter S and the receiving cone 8 for the receiver M (the detector) as well as the volume common to both cones (the dashed area 9).

Figure 3:
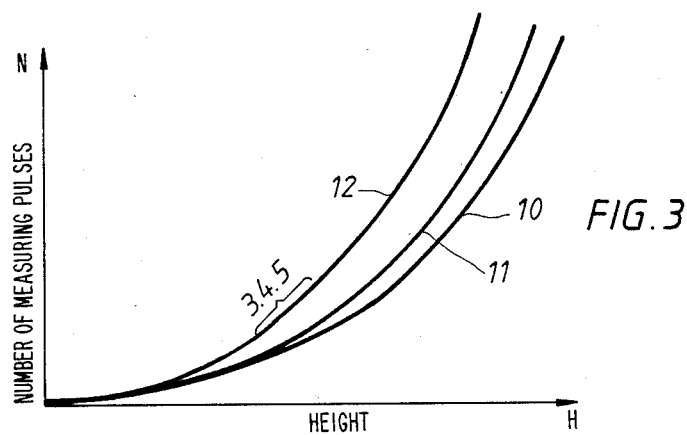
FIG. 3 shows the ratio between measuring height (h) and the number of measuring pulses (n)

The fact that the atmospheric attenuation can vary significantly at different altitudes in the atmosphere will be clear from FIG. 3, in which n is the number of measuring pulses per height level at a constant pulse power required for a given received signal in the detector M. The curve 10 indicates very good visibility conditions, the curve 11 indicates normal visibility conditions and the curve 12 indicates "bad" visibility conditions and different visibility conditions at different measuring heights h.

If T is a transmission factor (the conversion function for reflected light and attenuation) which is smaller than 1 (which applies to light attenuation in the atmosphere); for good visibility (curve 10):

$$n = (k \times h^2)/(T_{10}) \approx k \times h^2$$

(where k is a constant)
for normal visibility (curve 11):

$$n = (k \times h^2)/(T_{11}), \text{ and}$$

for bad visibility (curve 12):

$$n = (k \times h^2)/(T_{12})$$

Under bad visibility conditions (at level 3, 4 or 5), it is, for example, possible to increase the number of pulses per level, thus obtaining an n-h curve, which is more like the curve for 12.

The compensation for variable atmospheric attenuation is suitably added to a basic compensation, which is determined as a constant when the attenuation is small, times $h^2$ (where h represents the current measurement level), and a special compensation to take account of the distance between the transmitter and the receiver.

Compensation for the attenuation of the measuring signal is best carried out with the same measuring system, and thus in the same air space, as when measuring the existence of, for example, a cloud. In addition, when the attenuation in the air space is great or when the clouds are so thick that compensation is not possible over the entire measuring range, another action can be taken, namely, a signal can be given which indicates that the measuring means cannot extend over its planned-for measuring range with normal measuring accuracy. A measurement procedure can be restarted if the integral of the measuring energy received by the receiver indicates that reliable measurement above a given level is not possible.

Using a fixed compensation is acceptable when the atmospheric attenuation is small in the detected air space. A cloud can then be detected at any level within the measuring range. In the case of greater atmospheric attenuation, the measured value would have resulted in a reduction of the measuring signal, had there not been the automatic compensation provided by the method of the invention.

The attenuation of signal intensity, which occurs when a cloud is present within the measuring range, will be compensated for in a similar manner. Because the emitted measuring energy for altitudes above the cloud has increased to the extent that is practically possible, it is possible to indicate one or more further clouds at higher levels up to the limit of the measuring range.

Among the advantages of the method according to the invention can be mentioned the following:

The useful life of the transmitter is increased.

Measurements can be made at greater altitudes within a given time and therefore measurements can be effected at higher altitudes.

The measuring sequences can be interrupted when the maximum possible height level has been reached and a new measurement sequence can be started.

Information about the possible maximum measuring height for the prevailing weather conditions can be given.

The detector can be made smaller, which results in a cheaper and better detecting system.

The method described above can be varied in many ways within the scope of the following claims.

What is claimed is:

1. A method for measuring cloud height, in which each measuring operation is divided into a number of altitude bands, starting at the lowest band nearest to the ground and extending up to the highest band at the top of the measuring range, emitting a train of light pulses from a transmitter towards a selected air space, integrating and measuring light signals reflected towards a receiver, compensating a currently measured value as a result of reflected light from all bands underlying the band where measurement is currently being made by controlling the measuring energy emitted for the altitude band which is of present interest by changing at least one of the time, the pulse frequency, and the pulse energy for each band in such a way that the signal energy, detected in the signal detector for each altitude band is at least substantially maintained at a specified level and is thus compensated for variations in atmospheric attenuation in the underlying bands.

2. A method according to claim 1, in which the value of the attenuation-dependent compensation is added to a basic compensation, which is determined as a constant times $h^2$ where h is the height of the current altitude band in which measurement is being made.

3. A method according to claim 1, in which an allowance is made for the geometrical relation between the transmitter beam and the receiver field of view.

4. A method according to claim 2, in which the measurement of atmospheric attenuation is carried out with the same measuring system, and thus in the same air space, as the measurement of the existence of a cloud, and the like.

5. A method according to claim 3, in which the measurement of atmospheric attenuation is carried out with the same measuring system, and thus in the same air space, as the measurement of the existence of a cloud, and the like.

6. A method for measuring cloud height according to claim 1, in which when the attenuation in the air space is so great or such thick clouds occur that compensation is not possible over the entire measuring range, a signal is emitted which indicates that the measuring means cannot reach the extreme of its measuring range with normal measurement accuracy.

7. A method according to claim 1, in which immediate re-start of a measuring procedure takes place when the integrated measuring energy in the receiver assumes such a value that practical measurement at high altitude bands is not possible.

8. A method according to claim 2, in which immediate re-start of a measuring procedure takes place when the integrated measuring energy in the receiver assumes such a value that practical measurement at high altitude bands is not possible.

9. A method according to claim 3, in which immediate re-start of a measuring procedure takes place when the integrated measuring energy in the receiver assumes such a value that practical measurement at high altitude bands is not possible.

10. A method according to claim 1, in which the measured value of signal attenuation is used for calculating the vertical visibility.

11. A method according to claim 2, in which the measured value of signal attenuation is used for calculating the vertical visibility.

12. A method according to claim 3, in which the measured value of signal attenuation is used for calcutatying the vertical visibility.

* * * * *